United States Patent [19]

Pouliot

[11] 4,378,708
[45] Apr. 5, 1983

[54] NORMAL FRICTION FORCE DEVELOPING SYSTEM FOR TRACTION DRIVE TRANSMISSIONS

[75] Inventors: Harvey N. Pouliot, Livermore, Calif.

[73] Assignee: Vadetec Corporation, Troy, Mich.

[21] Appl. No.: 217,751

[22] Filed: Dec. 18, 1980

[51] Int. Cl.³ ............... F16H 13/10; F16H 13/00; F16H 15/16
[52] U.S. Cl. .................................. 74/191; 74/207; 74/208
[58] Field of Search .............. 74/190, 191, 193, 198, 74/207, 208, 209, 211, 192

[56] References Cited

U.S. PATENT DOCUMENTS

| | | | |
|---|---|---|---|
| 3,224,285 | 12/1965 | Maichen | 74/192 |
| 4,112,779 | 9/1978 | Kemper et al. | 74/191 |
| 4,112,780 | 9/1978 | Kemper et al. | 74/191 |
| 4,152,946 | 5/1979 | Kemper | 74/196 |
| 4,187,731 | 2/1980 | James | 74/198 |
| 4,233,851 | 11/1980 | Kemper | 74/191 |
| 4,277,982 | 7/1981 | Kemper | 74/191 |
| 4,280,369 | 7/1981 | Pouliot | 74/191 |
| 4,296,647 | 10/1981 | Kemper | 74/191 |

FOREIGN PATENT DOCUMENTS 2033034  5/1980  United Kingdom .................. 74/191

*Primary Examiner*—Leslie A. Braun
*Assistant Examiner*—Lawrence J. Gotts
*Attorney, Agent, or Firm*—Ziems & Walter

[57] ABSTRACT

A biconical torque body construction for traction drive transmissions in which a pair of hollow cone members, telescopically joined at the base or large diameter ends thereof for relative axial movement, are keyed or otherwise prevented for rotation relative to each other. A torque member is supported centrally within the hollow cone members with freedom of movement axially and rotatably relative to both cone members and constitutes the sole connection of the body for torque transmission to a transmission unit output load. The torque member carries one side of a ramp system cooperable with at least one of the cone members so that torque transmission between the cone members and the torque member will develop an axial force acting to separate the two cone members on the axis of the biconical body and proportional to the output torque load imposed on the body. The torque member is compression-resistant at least for that portion of its length between the ramp system and one of the cone members.

5 Claims, 4 Drawing Figures

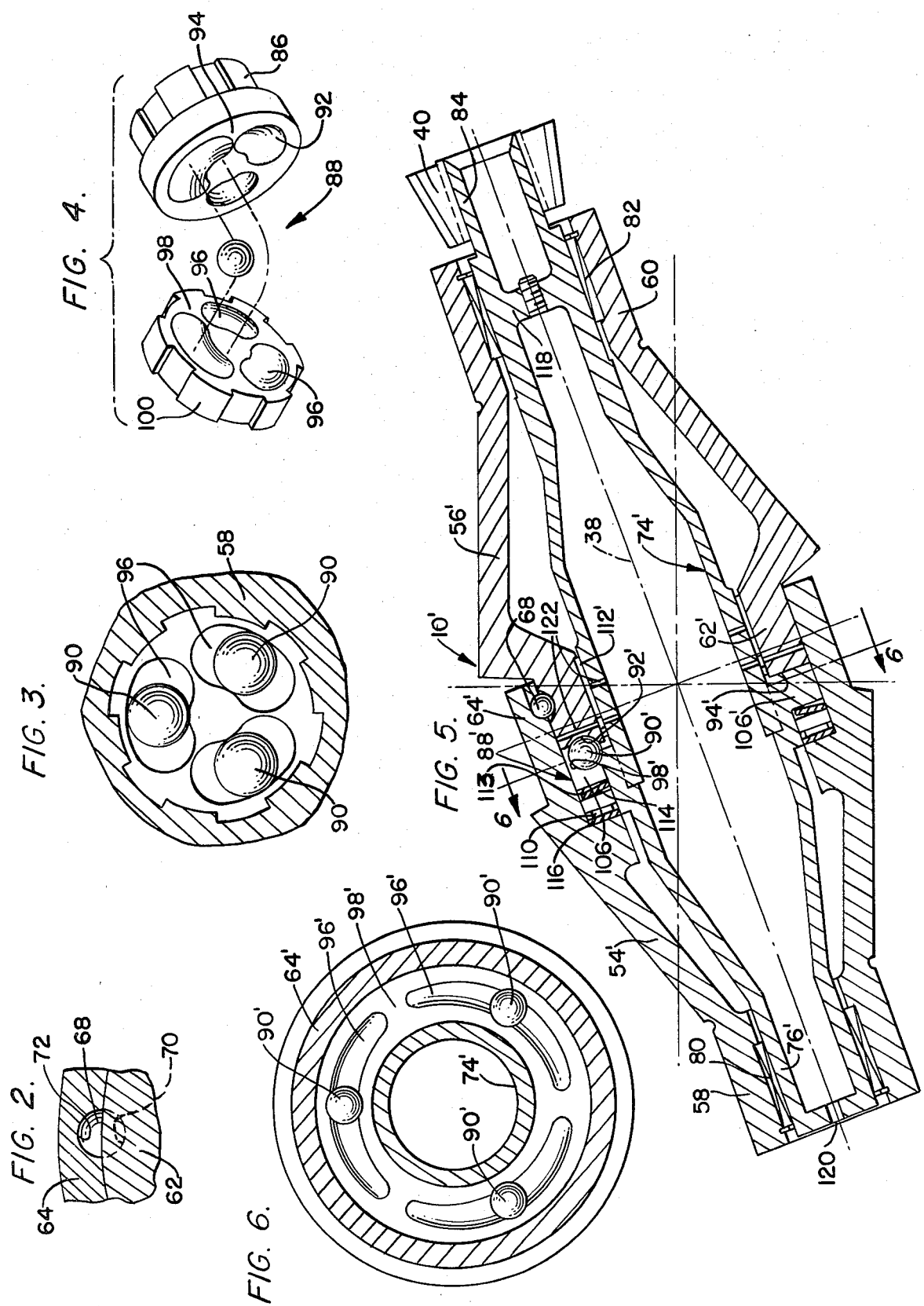

NORMAL FRICTION FORCE DEVELOPING SYSTEM FOR TRACTION DRIVE TRANSMISSIONS

BACKGROUND OF THE INVENTION

This invention relates to traction drive transmissions and more particularly, it concerns improvements in torque body constructions used in continuously variable traction drive transmissions and by which normal forces developed between rolling traction surfaces are varied to account for varying torque loads.

In U.S. Pat. Nos. 4,112,779, 4,112,780 and 4,152,946 several continuously variable transmission embodiments are disclosed in which three frame supported working or torque bodies operate to transmit a mechanical power input to a rotatable output at infinitely or continuously variable speed ratios within the design range of the particular transmission embodiment. In the transmissions of this general class, two of the torque bodies are in rolling friction contact with each other at two points of contact as a result of one of the two bodies being of a biconical configuration to define oppositely convergent traction surfaces of revolution about one axis and the other of the two bodies taking the form of a rotatably coupled pair of rings defining complementary traction surfaces about another axis inclined with respect to and intersecting the one axis. The rings are adjustable in a manner to vary the radius ratio of the contacting traction surfaces and thus attain the continuously variable speed ratio for which the transmission is primarily intended.

In a commonly assigned U.S. patent application Ser. No. 06/005,605, filed Jan. 22, 1979, by Harvey N. Pouliot, now U.S. Pat. No. 4,280,369, various embodiments of a ball/ramp system are disclosed for retaining the engaged rolling surfaces in contact under normal force loads generally proportional to the output torque load of the transmission. In the system disclosed in this application, the biconical torque body of the transmission is provided as an assembly of two conical members supported by a common central shaft in a manner permitting axial separation of the conical members along the shaft and also permitting for rotation of the cone members relative to each other and relative to the shaft. The shaft is coupled either directly or indirectly to the transmission output load and carries a central splined ring or sleeve between the base ends of the cone members. The sleeve as well as the base ends of the respective cone members are engaged by ball/ramps so that torque transmitted between the cones and the shaft will result in a force tending to separate the cones, the separating force being a function of the torque load on the shaft. As pointed out in the application, the potential exists for an unwanted torque path between the cone members such that under conditions of zero or near zero output loading, the ball/ramp system can become self-energizing to bind the conical members against the traction rings with which they cooperate, a situation which can result in a lock-up of the transmission components. This problem is solved in accordance with certain of the embodiments disclosed in the application by providing one of the cone members with a lead bias in a way that some force will be transmitted by the ball/ramp at all times and thus avoid the effects of a torque path between the individual cone members.

In a commonly assigned U.S. patent application Ser. No. 06/077,833, filed Sept. 21, 1979, by Yves Jean Kemper, now U.S. Pat. No. 4,277,982, a biconical torque body construction is disclosed in which the central load coupled supporting shaft is eliminated. In this instance, the biconical body is constituted by two conical members connected at their bases for axial and rotational movement relative to each other and in which one of the two cone members is coupled for torque transmission with the output load of the transmission unit. The one cone so coupled with the load is provided with a pilot cone extending to the small end of the other cone and coupled for torque transmission therewith through a ramp assembly. With variations in output load, the other cone member will react through the ramp assembly to develop the axial separating force by which both cone members are retained in rolling friction engagement with the appropriate working body of the transmission. By avoiding the provision of a central shaft, the problems associated with deflection of the central shaft and the unwanted torque path between the cone members are avoided.

While the normal force developing systems disclosed in these prior applications represent significant advances toward the solution of problems experienced with traction drive transmissions of the type under discussion, there is need for improvement particularly in the provision of a biconical torque transmitting body which may be easily fabricated and assembled to include an effective and reliable normal force developing system.

SUMMARY OF THE PRESENT INVENTION

In accordance with the present invention, a biconical torque body construction is provided in which a pair of hollow cone members, telescopically joined at the base or large diameter ends thereof for relative axial movement, are keyed or otherwise prevented from rotation relative to each other. A central torque member is supported within the hollow cone members with freedom of movement axially and rotatable relative to both cone members. The central torque member is coupled for torque transmission with the transmission unit output load and carries one side of a ramp system cooperable with another side of the ramp system carried by at least one of the cone members so that torque transmission between the cone members and the central torque member or load will develop an axial force proportional to the load and acting to separate the two cone members on the axis of the biconical body.

The torque member is preferably tubular and also of generally biconical configuration to complement the assembly of the hollow cone members. In the preferred embodiment, the ramp system is contained within the relatively small diameter or journal end of one of the cone members to be totally isolated from any bending stresses in the biconical body. An axial separating force is transmitted to the base end of the other cone member by the compressive loading on the central torque member and in response to torque transmitted between both cone members and the central torque member.

A primary object of the invention is to provide an easily constructed and assembled biconical torque body equipped with a normal force developing system which is responsive to transmission output load without interference from internal torque body stresses under loading imposed on the body. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 2 is an enlarged fragmentary cross-section on line 2—2 of FIG. 1;

FIG. 3 is an enlarged fragmentary cross-section along line 3—3 of FIG. 1;

FIG. 4 is an exploded perspective view illustrating components of a ball/ramp system incorporated in the embodiment of FIG. 1;

DETAILED DESCRIPTION OF THE PREFERRED EMBODIMENTS

Figure 1:
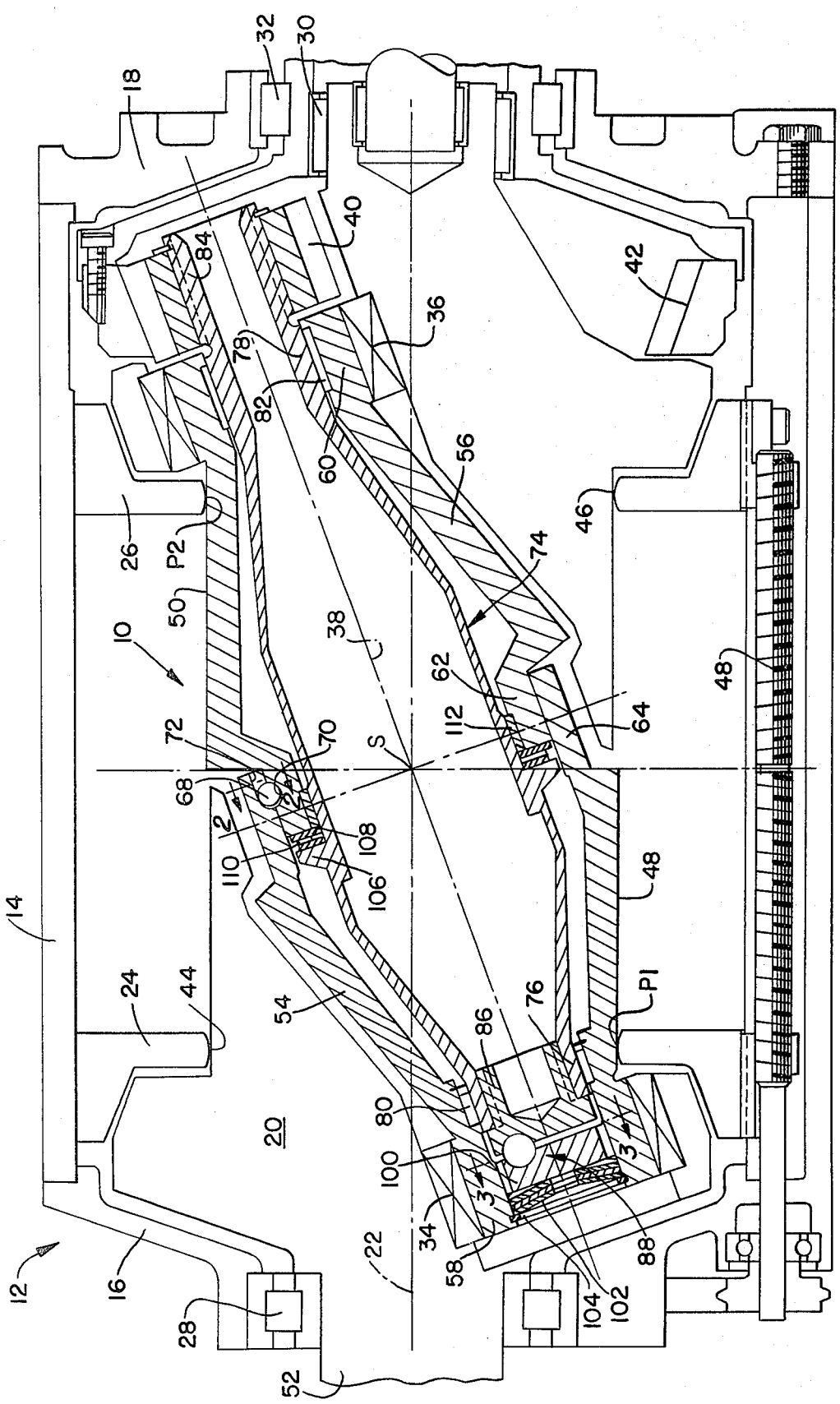
FIG. 1 is a partially schematic longitudinal cross-section through a continuously variable traction drive transmission unit incorporating one embodiment of the invention.
Figure 7:
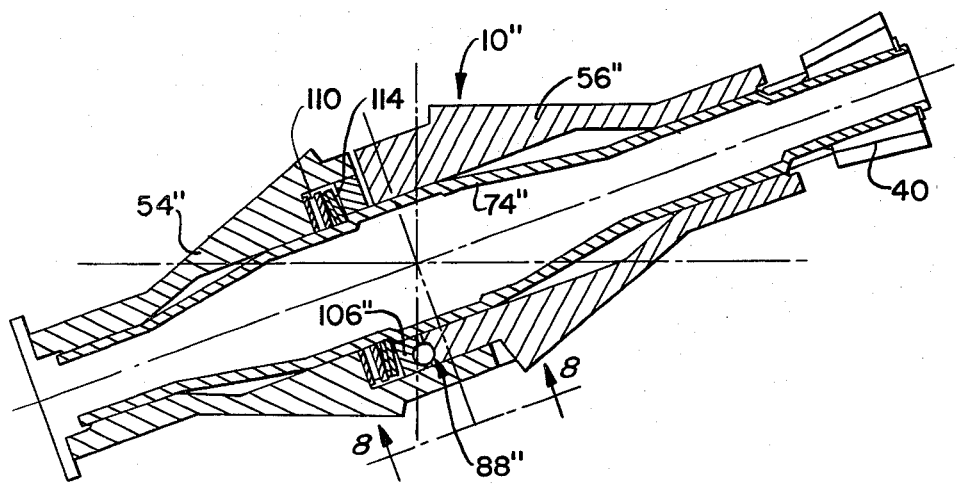
Figure 8:
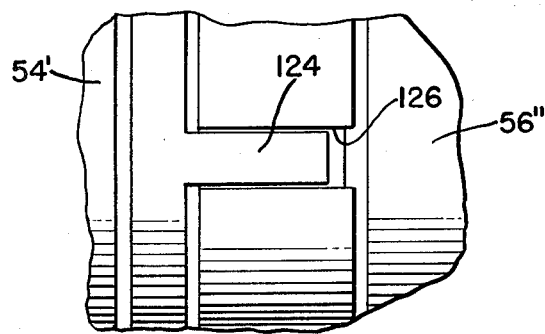

As shown in FIG. 1 of the drawings, one embodiment of a biconical torque body constructed in accordance with the present invention is generally designated by the reference numeral 10 and incorporated in a continuously variable transmission unit 12. The unit 12 is of a type disclosed in U.S. Pat. No. 4,152,946 and, as such, includes, in addition to the body 10, a fixed exterior frame or housing 14 having end frames 16 and 18, a crank-like body 20 rotatable as a unit within the housing 14 about a first or primary transmission axis 22, and a pair of rings 24 and 26 which are concentric with the axis 22, axially slidable toward and away from each other and fixed against rotation relative to the housing 14.

The crank-like body 20 is supported at one end in the end frame 16 by radial bearings 28 and at the other end in the end frame 18 by concentric radial bearings 30 and 32. The biconical torque body 10, in turn, is supported by radial bearings 34 and 36 from the crank-like body 20 for rotation about a second axis 38 which is inclined with respect to and intersects the primary axis 22 at a point S of axes intersection. Drivably fixed at one end of the biconical body 10 is a pinion gear 40 in meshing engagement with an internal ring gear 42 which is journalled for rotation on the primary axis 22 between the concentric radial bearings 30 and 32.

The rings 24 and 26 define internal traction surfaces 44 and 46, respectively, which are smooth surfaces of revolution about the primary axis 22. The rings 24 and 26 and thus the surfaces 44 and 46 are adjustable axially toward and away from each other in symmetry with respect to the point S of axes intersection by an appropriate control means such as one or more double pitched screws 48 adapted to be connected to a control motor (not shown). The traction surfaces 44 and 46 are in rolling friction contact at diametrically opposite points P1 and P2 with oppositely convergent frustoconical traction surfaces 48 and 50 on the exterior of the torque body 10. The traction surfaces 48 and 50 are smooth surfaces of revolution about the second axis 38 and related in terms of angle of convergence to the angle at which the second axis intersects the first axis so the contacting sides thereof lie parallel to the first axis in the plane containing the first and second axes. Thus, the interior traction surfaces 44 and 46 on the rings 24 and 26 may remain in rolling friction contact during movement of the rings axially throughout their range of travel.

In the operation of the transmission unit 12, a power input may be applied directly to a shaft extension 52 of the crank-like body 20 to rotate the body 20 about the primary axis 22. The rotating body 20 will carry the biconical body 10 in nutation such that the axis 38 orbits in conical fashion about the primary axis 22. Relative rotation of the biconical body 10 and thus the pinion gear 40 about the second axis 38 will depend on the axial position of the rings 24 and 26 and the radius ratio of the surfaces 44 and 46 to the surfaces 48 and 50 at the points P1 and P2. An output connected for rotation with the internal ring gear 42 will be driven in rotation at speeds which are a function both of orbital movement of the second axis 38 about the first axis 22 and of rotation of the torque body 10 about the second axis 38, all as described in each of the U.S. patents previously cited.

Because a substantial part of the torque load transmitted during operation of the unit 12 is transmitted by rolling friction at the contact points P1 and P2, the traction surfaces 44, 46 and 48, 50 must be retained against each other under normal force loading capable of preventing slippage between the contacting traction surfaces and preferably under such a normal force loading which is proportional to the unit output torque load at the ring gear 42. To this end, the torque body 10 of the present invention is constructed to include two cone members 54 and 56, the exterior surfaces of which define the respective traction surfaces 48 and 50. Both cone members 54 and 56 are hollow throughout and terminate at the small diameter or outboard end in cylindrical journal portions 58 and 60, respectively. The inboard, large diameter or base ends of the cone members are joined telescopically for relative freedom of axial movement along the axis 38. Specifically, the base end of the cone member 56 in the illustrated embodiment, or the cone member adjacent to the pinion gear 40, is formed as a cylindrical race portion 62 fitted within a complementing outer race portion 64 on the cone member 54.

As shown in FIGS. 1 and 2, the cone members 54 and 56 are keyed or otherwise coupled against rotation relative to one another by one or more ball keys 68 in the embodiment of FIG. 1. Although only one ball key is shown and is adequate in practice, any number of keys located symmetrically about the axis 38 may be used. The ball keys prevent relative rotation between the cone members as a result of a hemispherical pocket 70 in the inner race portion 62 and a cylindrical seating pocket 72 in the outer race portion 64. The ball 68 will thus resist relative rotation between the race portions 62 and 64 and thus the cone members 54 and 56 by resistance to shear. Relative axial movement of the races and thus of the cones will be uninhibited and, moreover, assembly of the two cone members with the ball key will be facilitated.

Supported within the hollow cone members 54 and 56 is a compressive-resistant torque member generally designated by the reference numeral 74 in FIG. 1. The torque member 74 is preferably hollow or tubular and also of generally biconical configuration to complement the interior cavity defined by the hollow cone members 54 and 56. The torque member 74 is supported at opposite ends 76 and 78 from the respective cone members 54 and 56 by bearings 80 and 82, respectively. The bearings may be sleeve bearings or needle bearings but in either case function to support the torque member 74 from the cone members 54 and 56 for both rotational and axial freedom of movement relative to the cone members.

As shown in FIG. 1, the end 78 of the torque member 74 supported from the cone member 56 extends as a splined hub 84 to which the pinion gear 40 is connected. The opposite end 76 of the torque member 74 is splined to a cap 86 forming one part of a ball/ramp assembly 88.

As shown most clearly in FIGS. 3 and 4 of the drawings, the ball/ramp assembly 88 in the embodiment illustrated in FIGS. 1-4 includes three spherical balls 90 seated in double ramp pockets 92 in an end face 94 of the cap member 86 and also seated in identical ramp pockets 96 formed in an end face 98 of a plug member 100 splined or otherwise non-rotatably fixed within the journal end 58 of the cone member 54. As shown in FIG. 1, the plug member is secured against axial displacement within the journal portion 58 by a snap ring 104 through a set of Belleville spring washers 105 which develop a pre-load bias tending to separate the cone members 54 and 56. The ramp pockets 92 and 96 define oppositely inclined or double ramp surfaces inclined to a central valley or pocket and will operate to separate the end faces 94 and 98 by compression of the balls 90 in response to relative rotation between the members 86 and 100 and thus between the torque member 74 and both cone members 54 and 56. Because the pockets 92 and 96 define double ramp surfaces, the relative rotation between the cone members and the torque member is reversible; that is, the same axial displacement will result regardless of the direction of rotation between the cap member 86 and the plug member 88.

With reference again to FIG. 1, it will be noted that the torque member 74 is provided at its central region with a projecting annular flange portion 106 which defines a circular ledge 108 against which a thrust bearing 110 is seated. The opposite side of the thrust bearing 110 bears against the end of the inner cylindrical race portion 62 of the cone member 56. Also, a stabilizing radial bearing or sleeve 112 retains the central region of the torque member 74 in concentricity with the cone members 54 and 56.

In light of the thrust bearing 110, it will be appreciated that any axial thrust developed by the ball/ramp assembly 88 between the cone member 54 and the torque member 74 will be transmitted by compression in the torque member 74 to an axial separating force between the cone member 54 and the cone member 56. Moreover, because of the connection of the pinion gear 40 to the torque member 74 and the relative freedom of rotation and axial movement between the torque member 74 and the cone members 54 and 56, the magnitude of the force acting to separate the cone members 54 and 56 will be proportional to the torque load on the pinion gear 40 and thus on the torque transmitted between the traction surfaces 44, 46 and the traction surfaces 48, 50 at the points P1 and P2 during operation of the transmission unit 12.

While the basic operation of components included in the torque body 10 may be understood from the preceding description, the particular construction illustrated in FIG. 1 has several advantageous features which are not in themselves apparent but which, nevertheless, are important particularly to heavy duty application of the transmission unit 12. For example, the location of the ball/ramp assembly 88 completely within the cylindrical journal portion 58 of the cone member 54 effectively isolates the assembly 88 from all stresses to which the body 10 is subjected in operation. Also, the telescopic interconnection at the base ends of the cone members through the cylindrical race portions 62 and 64 operates by itself to sustain the same stresses without reliance on the torque member 74. In this latter respect, it is important to efficient operation of the ball/ramp assembly that the sole torque path between the torque member 74 and the cone members 54 and 56 be restricted to the ball/ramp assembly 88. By avoiding relative flexure between the cone members and the torque member 74, any tendency for the torque member to bind in the region of the bearing sleeve 112 must be avoided. Because the loading seen by the torque body 10 as a result of normal force development at the contact points P1 and P2, loading at the race portions 64 and 62 is largely in shear and is therefore not transmitted to the torque tube 74. Finally, and perhaps most importantly, the operation of the ball key 68 to prevent relative rotation between the cone members 54 and 56 operates to positively prevent a torque path between the cone members and the torque tube which might cause unwanted operation of the ball/ramp assembly 88.

Thus it will be seen that as a result of the present invention, an improved torque body is provided for continuously variable transmissions of the type described and by which the stated and other objectives are completely fulfilled. It will also be apparent that modifications and/or changes may be made in the described embodiments without departure from the present invention. Accordingly, it is expressly intended that the foregoing description and accompanying drawing figures are illustrative only, not limiting, and that the true spirit and scope of the present invention be determined by reference to the appended claims.

We claim:

1. In a biconical torque transmitting body having a pair of oppositely convergent, generally conical traction surfaces of revolution about one axis inclined with respect to and intersecting another axis coaxial with another pair of axially spaced traction surfaces against which said conical traction surfaces are retained under normal force loading for the transmission of torque by rolling friction between said respective pairs of rolling surfaces, such normal force loading being variable in accordance with torque loading on the biconical body and developed by force application acting to separate a pair of cone members carrying said conical surfaces along said one axis, the improvement comprising:
   a torque member coaxial with and supported by the biconical body with freedom for rotatable and axial movement relative thereto:
   ramp means operative between said torque member and said cone members to develop an axial thrusting force between said cone members; and
   means for preventing relative rotation of said cone members while permitting axial separation thereof.

2. The apparatus recited in claim 1, wherein said last mentioned means comprises at least one ball key seated in two pockets, one of said pockets carried by each of said cone members and at least one of said two pockets being elongated in a direction parallel to said one axis to provide for said axial separation of said cone members.

3. The apparatus recited in claim 1, wherein said torque member comprises means for connecting the torque body to a torque load and compression-resistant means between said ramp means and the base end of one of said cone members.

4. The apparatus recited in claim 3, wherein each of said cone members is formed having an outboard cylindrical journal portion and said torque member extends throughout the length of the biconical body to be supported within said journal portions, said ramp system having opposite reactive sides carried respectively by said torque member and one of said cone members, said compression-resistant means comprising a flange portion intermediate the length of said torque member to engage the base end of the other of said cone members and a longitudinal portion of said torque member extending between said flange portion and said ramp means.

5. The apparatus recited in claim 4, wherein said ramp means is contained within the journal end portion of said one cone member.

* * * * *